March 21, 1939. G. P. ECONOMAKIS 2,151,377
CANDY CUTTING MACHINE
Filed Sept. 15, 1938 2 Sheets-Sheet 2
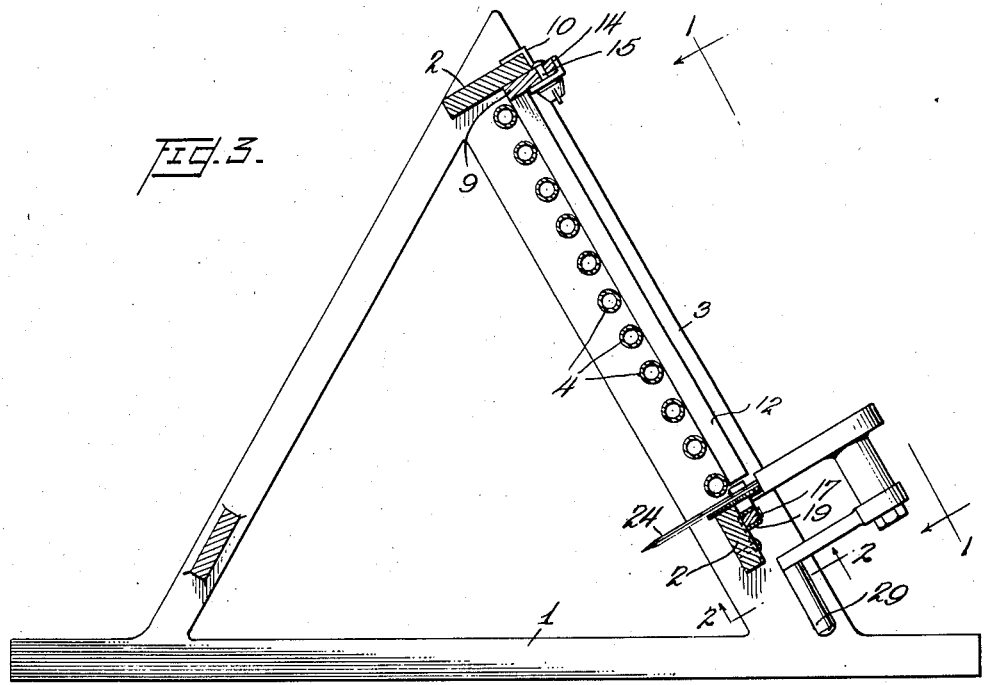
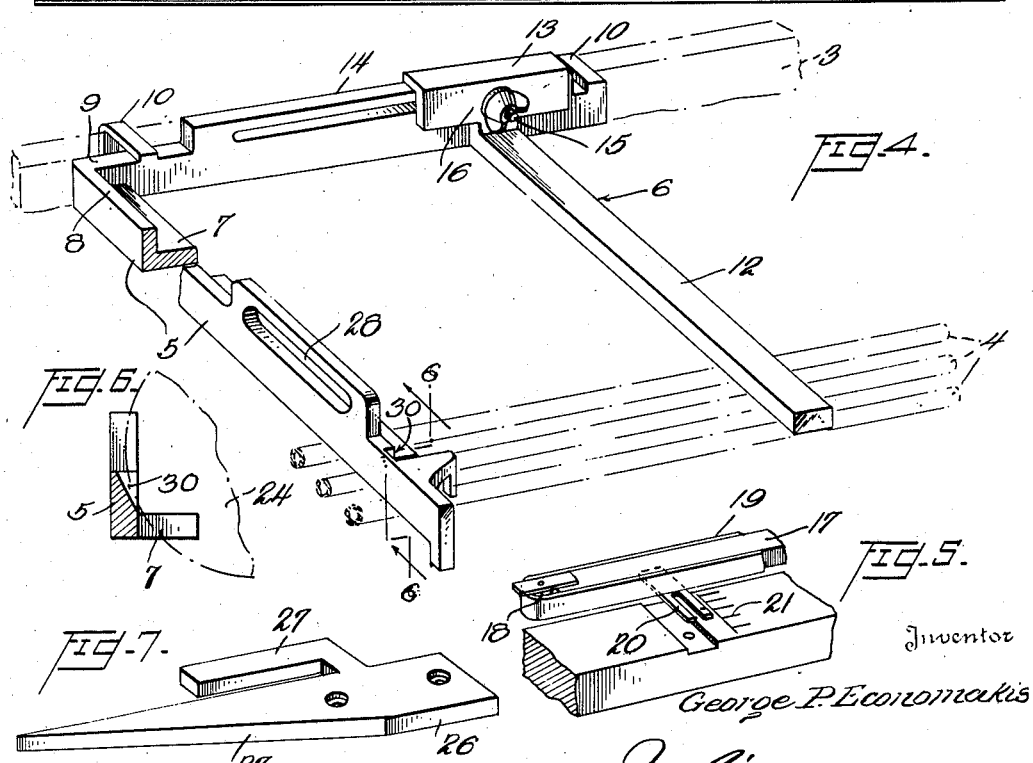
Inventor
George P. Economakis
Attorney Patented Mar. 21, 1939

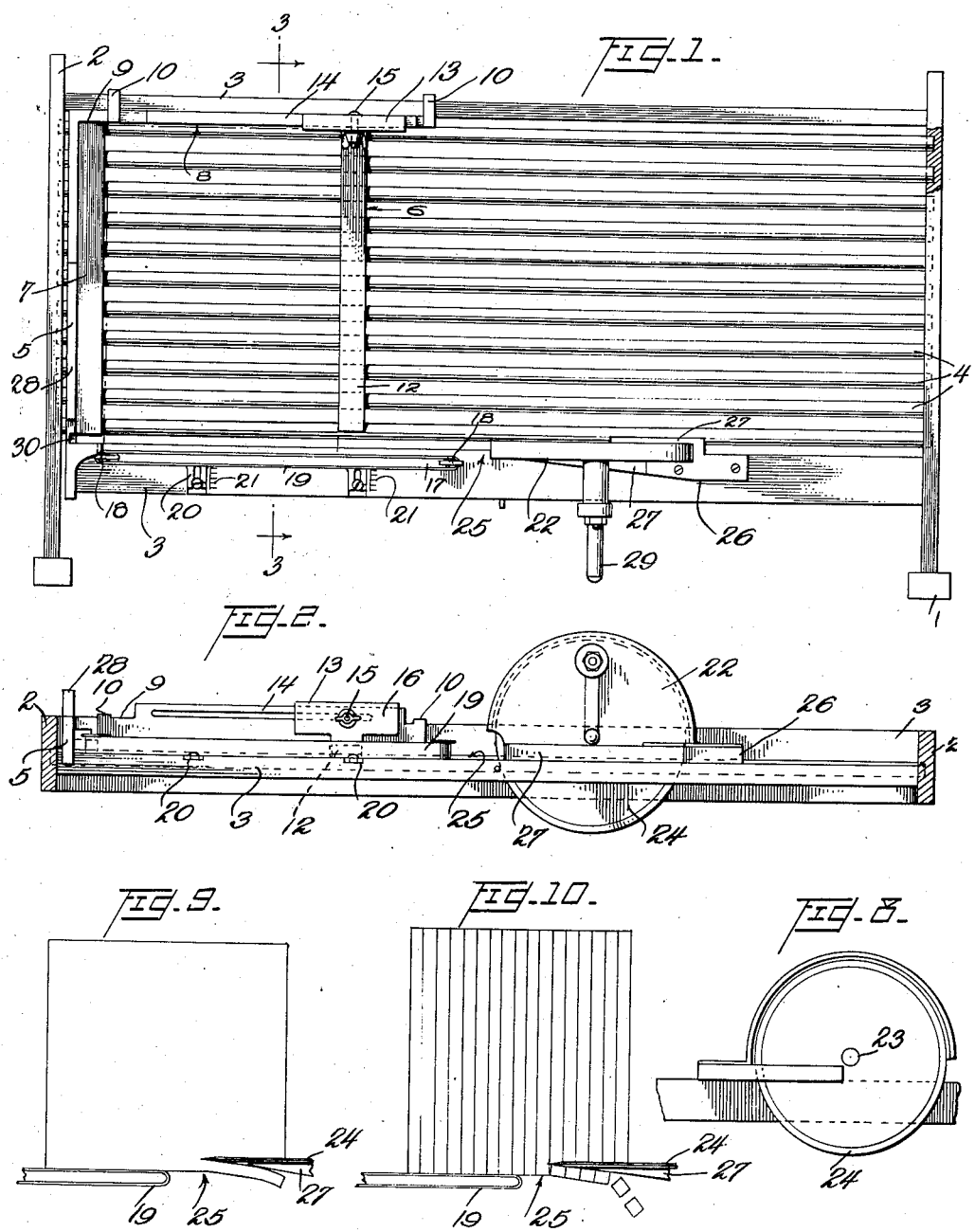

2,151,377

UNITED STATES PATENT OFFICE 2,151,377

CANDY CUTTING MACHINE

George P. Economakis, Asbury Park, N. J.

Application September 15, 1938, Serial No. 230,149

11 Claims. (Cl. 107—22)

This invention is directed to an improvement in machines for cutting candy, and more particularly to a machine of simple construction and few parts in which a candy mass of desired thickness may be readily and quickly divided into caramel form, blocks or sections.

The primary object of the present invention is the provision of a machine in which the candy mass of uniform thickness corresponding to one dimension of the desired caramel is mounted upon a support and manually moved on that support bodily past a manual or otherwise driven knife by means of which the candy mass is successively divided, through repeated operation, into a series of longitudinal strips, and such strips later divided through similar operation into caramel or like formed blocks.

A further object of the invention is the provision of means wherein the candy block or the subsequently divided strips are supported for movement past the knife in a manner to prevent the candy sticking or otherwise adhering to the fixed parts of the device, and with the further provision that the uncut candy mass will, following the severance of each strip, gravitate to an operative position for the severance of the succeeding strip.

A further object of the invention is the provision of means for determining the width of the strip cut by the knife with such determining means adjustable to vary the width of the strip at will.

A further object of the invention is the provision of means whereby the pusher elements, by which the candy mass is fed past the knife, are adjustable to accommodate different lengths of candy mass.

A further object of the invention is the provision of means wherein the element for supporting the weight of the candy mass during operation of the knife and the bed on which the candy mass rests are designed particularly with a view to avoiding any undue friction in the movement of the candy mass and to prevent the candy from sticking during operation.

The invention is illustrated in the accompanying drawings in which:

Figure 1 is a plan of the candy cutting machine.

Figure 2 is a side elevation of the same.

Figure 3 is a view in section showing the device arranged in operative position.

Figure 4 is a broken perspective illustrating particularly the pusher mechanism.

Figure 5 is a broken perspective showing the means of adjusting the supporting belt.

Figure 6 is a section on line 6—6 of Figure 4.

Figure 7 is a perspective view of the guard for preventing candy accumulations on the cutter.

Figure 8 is a side elevation of the cutter.

Figure 9 is a diagrammatic view illustrating the cutting of the candy mass into strips.

Figure 10 is a similar view showing the strips divided into caramel blocks.

The invention comprises a base or candy supporting frame 1 including end bars 2 and side bars 3 connecting the end bars to provide a substantially rectangular open construction. Mounted in the end bars, between the side bars, are longitudinally ranging circular rods 4, so mounted in the end bars as to be freely rotatable without appreciable endwise movement. A pusher frame is mounted for sliding movement longitudinally of the rods 4. This pusher frame comprising two bars 5 and 6 is arranged transverse the rods 4 and is designed to move the candy mass in both directions longitudinally of the rods. The pusher bar 5 comprises a plate-like section 7 to rest immediately above the rods 4 and and an end section 8 which at one end is provided with a guide bar 9 which extends longitudinally of and in contact with the adjacent side bar 3 to guide the pusher frame in operation. The guide bar 9 is provided with a clip 10 which partly embraces the adjacent side bar 3 to prevent separation of the parts. The opposite end of the end section 8 of the pusher bar 5 overlies the opposite side bar 3 and is recessed in its under edge to have a sliding guiding cooperation with such side bar.

The pusher bar 6 is a flat plate-like bar 12 having a cross strip 13 at one end which rests upon an auxiliary bar 14 secured to and overlying the guide bar 9, such auxiliary bar being spaced from the guide bar. A bolt 15 passes through the vertical section 16 connecting the plate 12 and cross strip 13 and through the space between the auxiliary bar 14 and the guide bar 9 and is provided with a head and nut to permit longitudinal adjustment of the pusher bar 6 toward and from the pusher bar 5.

Overlying the side bar 3 at the side of the device opposite the mounting of the pusher bar 6 there is provided a strip 17 preferably provided with terminal rollers 18 over which rollers passes an endless band or ribbon 19. This band or ribbon presents an upper margin which is at right angles to the plane of and above the surface of the bars 4, so that this band provides a rest or support for the lower edge of the candy mass, as will later appear, and through its endless free movement affords a supporting medium which will insure ease of movement of the candy mass regardless of any sticky condition of the candy. As will be later apparent, this band determines the width of the strip or blocks cut from the candy mass and in order to provide for different cuts, the strip 17 carrying the band 18 is adjustable toward and from the bars 4. For this purpose the strip 17 is provided on its under surface, beyond the path of travel of the band 19, with slotted projections 20 through which bolts are passed to engage in appropriate openings in the underlying side bar 3. Through the medium of nuts on the bolts, the actual position of the supporting phase of the band 19 is adjustable relative to the bars 4 to determine the width of a strip cut from the candy mass. If desired and as preferred, graduations 21, preferably in inches and parts thereof, are marked on the strip or side bar 3 underlying the strip 17 in order to gauge the spacing of the respective ends of the operative phase of the band 19 from the bars 4 to insure uniformity in width of the strip to be cut.

The side bar 3 carrying the moving band is provided beyond the end of that band with a support 22 having a terminal bearing in which is mounted a shaft 23 carrying a circular blade 24 which is so arranged as to have its lower operative phase slightly below the plane of the cross bars 4 to insure that the candy mass will be cut through. Mounted on the adjacent side strip 3 contiguous the outer surface of the blade 24 is a chute 25 down which the severed strips or blocks are directed to a suitable surface or receptacle beyond the side bar.

Secured upon the side bar 3 to which the knife is affixed is a block 26 provided with spaced end projections 27 which extend immediately adjacent the respective surfaces of the blade above the operative phase thereof and tends to prevent candy strips or blocks, through frictional engagement with the knife, being carried around in the knife operation.

In use, the frame as an entirety is mounted upon supports by which it is held in an upright inclined position. That is when the frame is in operative position, it inclines rearwardly and upwardly from the knife. The candy mass is placed upon the rollers 4 with its lower edge resting and supported on the band 19 and its end edges resting between the pusher bars 5 and 6, the latter having been adjusted to accommodate the length of candy mass with which the device is then operating. By pressure on the presser bar 5, for example through a handle 28, the candy mass is moved longitudinally of the bars 4 and past the blade 24 which is being rotated by a crank handle 29. This movement causes a strip of the width determined by the adjustment of the band carrier to be cut from the mass, the cut strip being delivered through the chute 25. The pusher bar 5 is formed with a recess 30 in line with the knife so as to receive the edge of the knife and insure that the candy be carried past that edge. The candy mass is then moved rearwardly by use of the handle 28, the pusher bar 6 being connected to the bar 5 through the guide bar 9, and the described operation is repeated. The candy mass will thus be divided into a series of strips having a width determined by the adjustment of the band-carrying strip 17.

After the severance of each strip and the return of the candy mass to the operative end of the structure, such mass gravitates into contact with the band 19, this movement of the candy mass being incident to the inclination of the support as a whole and being facilitated by the freely rotating bars 4.

After the candy mass has been cut into strips, either for the full mass or as many strips as desired, the strips are positioned on and transverse the rollers 4. The operation is then continued as before, the strips being divided by the blade and thus forming the conventional caramel blocks. The blocks are delivered through the chute 25 and are of course afterwards wrapped or otherwise treated as desired in accordance with the ultimate purpose.

The device as a whole provides a very simple and economical structure made up of few parts, and particularly few operating parts, in which the candy may be readily divided according to the operation described into caramel-like blocks expeditiously and with minimum expense.

Of course, through the adjustment of the band-carrying strip, the long strips initially divided from the candy mass may be given any width within the range of the machine and the division of the cut strips into blocks may also be controlled by the adjustment of the band-carrying strips so that the final candy blocks may be square or of other rectangular dimension determined by the character of the caramel to be desired. Of course, the candy mass, which is originally placed upon the bars 4, is preferably rolled or otherwise formed to have a uniform thickness which of course may be of any desired and appropriate size. The width of the longitudinal divisions of the candy mass and subsequently of the cut strips may have dimensions similar to that of the initial candy mass or any other dimensions within the range of the device, equalling each other or varying from each other, as is readily provided for through the adjustments described.

It will be understood that while as shown the knife or cutter may be operated by hand, it is of course contemplated that such knife or cutter may be power operated or actuated in any appropriate manner to secure the desired results.

What is claimed to be new is:

1. A candy cutting machine including a candy mass support, means for moving the candy mass longitudinally of the support, a cutter for severing a strip from the candy mass during such movement, means for mounting the support to cause the candy mass to gravitate to a position for the cutting operation, and means for limiting the gravital movement of the candy mass under such gravital influence to position the candy mass for the cutting operation, said means moving with the candy toward the cutter.

2. In a candy cutting machine, a candy support made of freely rotatable elements, means for moving the candy mass longitudinally of such elements, a cutter for severing the candy mass adjacent an edge in substantial parallelism with the freely rotatable elements during movement of the candy mass in one direction, the support being mounted at an inclination to cause gravital movement of the candy mass transverse such freely rotatable elements following severing operation of the cutter.

3. A construction as defined in claim 1, wherein the candy mass support is in the form of spaced elements freely rotatable under the gravital movement of the candy mass.

4. A construction as defined in claim 1, wherein the means for limiting the gravital movement of the candy mass is in the form of an anti-friction element to avoid interference with the movement of the candy mass toward the cutter.

5. A construction as defined in claim 1, wherein the means for limiting the gravital movement of the candy mass is in the form of an endless moving band on which the candy mass is supported.

6. A construction as defined in claim 1, wherein the means for limiting the gravital movement of the candy mass is in the form of an endless moving band, together with means whereby the band may be adjusted relative to the cutting plane of the cutter to determine the width of the strip being cut.

7. A construction as defined in claim 1, wherein the means for moving the candy mass longitudinally of the support includes spaced pusher rods to receive the candy mass between them, one of which is adjustable relative to the other.

8. In a candy cutting machine, a frame including end bars and side bars, rollers extending longitudinally of the frame and mounted for free rotation in the end bars, a pusher rod overlying the rollers and slidably cooperating with one of the side bars, a second pusher rod adjustably connected with the first mentioned pusher rod and overlying the rollers, an endless band overlying the remaining side bar of the frame and forming a support for the candy mass when in a position to be cut, and a manually operable knife engaging and cutting the candy mass as the latter is moved under the influence of the first mentioned pusher rod.

9. A construction as defined in claim 8, including means for supporting the frame to permit gravital movement of the candy mass over the rollers and into contact with the endless band following each cutting operation.

10. A construction as defined in claim 8, wherein the first mentioned pusher rod is formed with a recess to receive the operative edge of the knife at the termination of the cutting operation to insure that the candy mass may be cut entirely through.

11. A construction as defined in claim 8, including means provided adjacent the cutter for receiving and delivering the strip cut from the candy mass to a position beyond the cutter.

GEORGE P. ECONOMAKIS.